US010154058B2

(12) United States Patent
Zinner

(10) Patent No.: US 10,154,058 B2
(45) Date of Patent: Dec. 11, 2018

(54) METHOD AND DEVICE FOR VALIDATING A TIMESTAMP OF A DATA TRANSMISSION

(71) Applicant: Robert Bosch GmbH, Stuttgart (DE)

(72) Inventor: Helge Zinner, Magdeburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 80 days.

(21) Appl. No.: 15/213,797

(22) Filed: Jul. 19, 2016

(65) Prior Publication Data
US 2017/0026144 A1 Jan. 26, 2017

(30) Foreign Application Priority Data
Jul. 22, 2015 (DE) .......... 10 2015 213 845

(51) Int. Cl.
H04L 7/00 (2006.01)
H04L 29/06 (2006.01)

(52) U.S. Cl.
CPC ........ H04L 63/1441 (2013.01); H04L 63/123 (2013.01); H04L 2463/121 (2013.01)

(58) Field of Classification Search
None
See application file for complete search history.

(56) References Cited

U.S. PATENT DOCUMENTS

| | | | |
|---|---|---|---|
| 2009/0158360 A1* | 6/2009 | Diab | H04L 12/40 725/75 |
| 2012/0140861 A1* | 6/2012 | Menon | B60T 7/18 375/356 |
| 2014/0022912 A1* | 1/2014 | Kim | H04L 12/40163 370/244 |
| 2015/0375578 A1* | 12/2015 | Patel | B60C 23/0418 340/442 |
| 2016/0191572 A1* | 6/2016 | Joy | H04L 12/413 370/402 |

* cited by examiner

Primary Examiner — Sithu Ko
(74) Attorney, Agent, or Firm — Norton Rose Fulbright US LLP; Gerard Messina

(57) ABSTRACT

A method for validating a timestamp, including receiving a first data packet, including first useful data, from a first transmitter, receiving a second data packet, including a first timestamp associated with the first useful data, comparing the first timestamp to a predefined second timestamp, which is associated with the first useful data, to determine a first validated timestamp, which is associated with the first useful data, receiving a third data packet, including second useful data, from a second transmitter, which is different from the first transmitter, receiving a fourth data packet, including a third timestamp associated with the second useful data, comparing the third timestamp to a predefined fourth timestamp, which is associated with the second useful data, to determine a second validated timestamp, which is associated with the second useful data, and comparing the first validated timestamp to the second validated timestamp.

8 Claims, 6 Drawing Sheets

METHOD AND DEVICE FOR VALIDATING A TIMESTAMP OF A DATA TRANSMISSION

CROSS REFERENCE

The present application claims the benefit under 35 U.S.C. § 119 of German Patent No. DE 102015213845.3 filed on Jul. 22, 2015, which is expressly incorporated herein by reference.

FIELD

The present invention is directed to a method and a device for validating a timestamp of a data transmission. A computer program and a machine-readable storage medium are also the subject matter of the present invention.

BACKGROUND INFORMATION

The control units used in vehicles, in particular in motor vehicles, are connected via a computer network, a so-called vehicle electrical system, to one another and to sensors for detecting states of the vehicle or parts thereof. The control units used in a vehicle fulfill different functions for the operation of the vehicle and receive data, which are transmitted by sensors, via the vehicle electrical system for this purpose. Many applications require preferably deterministic knowledge about the reliability of the sensor data. To ensure a preferably reliable function of the vehicle, the vehicle electrical system therefore has to meet particularly high demands with respect to the punctuality of the data transmitted on the vehicle electrical system.

SUMMARY

An example method in accordance with the present invention may have the advantage that the punctuality and integrity of the data transmission of useful data from various transmitters is recognizable by validation with the aid of timestamps. Thus, for example, useful data, which are intentionally falsified by an attack on the vehicle electrical system, are invalid due to absent or faulty synchronization of the vehicle electrical system, or are unpunctual or aged due to other disturbances, may be recognized and handled accordingly.

Advantageous refinements of and improvements on the method are described herein.

The present invention also relate to a method for transmitting a timestamp, which may be validated, for a data transmission and a device and a computer program which enable the same advantages.

BRIEF DESCRIPTION OF THE DRAWINGS

Exemplary embodiments are illustrated in the figures and explained in greater detail below.

DETAILED DESCRIPTION OF EXAMPLE EMBODIMENTS

Figure 1:
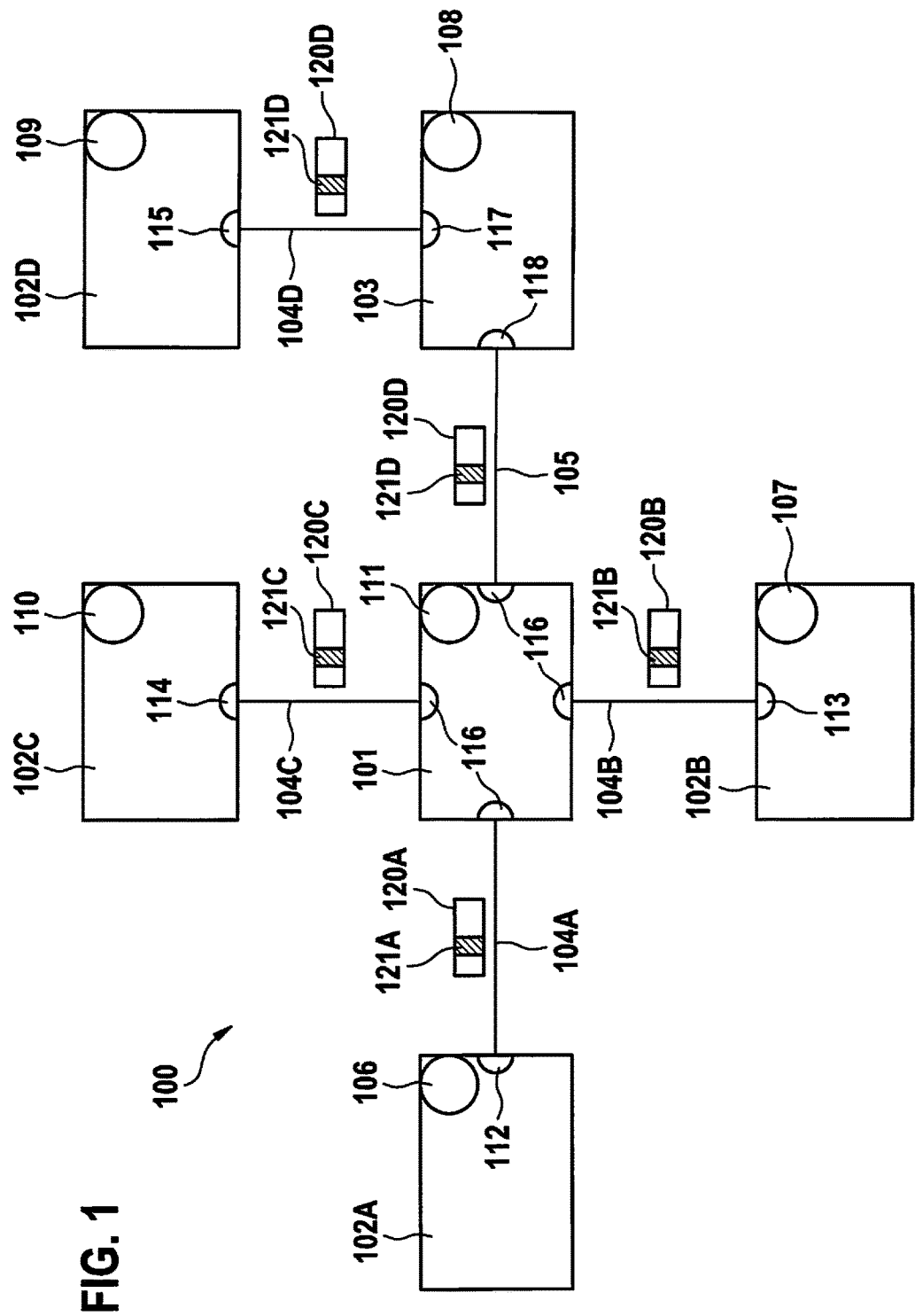
FIG. 1 schematically shows a part of a vehicle electrical system of a vehicle.

FIG. 1 schematically shows a part of a vehicle electrical system 100 of a vehicle, in particular a motor vehicle. The vehicle electrical system includes a control unit 101, multiple sensors 102A, 102B, 102C, 102D, and a switch 103. Sensors 102A, 102B, and 102C are connected in the example via a data bus 104A, 104B, and 104C, respectively, directly to control unit 101. A sensor 102D is connected in the example via a data bus 104D, switch 103, and a data bus 105 to control unit 101. In the example, an Ethernet data bus is used, for example, according to one of the standards Ethernet AVB, Ethernet TSN, 1000 Mbit/s Ethernet, 100 Mbit/s Ethernet, or 10 Mbit/s Ethernet. For example, the data are transmitted via twisted pair wires, in particular made of copper, preferably with the aid of physical transmission technology 100BASE-T1.

Control unit 101, sensors 102A, 102B, 102C, 102D, and switch 103 each include a clock generator 106, 107, 108, 109, 110, 111. Sensors 102A, 102B, 102C, 102D include a transmitter 112, 113, 114, 115. Control unit 101 includes one or multiple receivers 116. Switch 103 includes a first interface 117 and a second interface 118. The transmitters may additionally also be designed as receivers. The receivers may additionally also be designed as transmitters. The transmitters and receivers and the interfaces are designed to transmit or receive, respectively, data packets according to the transmission technology used on the data bus.

Particular sensors 102A, 102B, 102C, 102D transmit, for example, via particular transmitters 112, 113, 114, 115, data packets 120A, 120B, 120C, 120D. Data packets 120A, 120B, 120C, 120D are transmitted in the example with in each case at least one timestamp 121A, 121B, 121C, 121D, which is associated with particular data packet 120A, 120B, 120C, 120D, in a data frame, in particular an Ethernet data frame. The timestamps may also be transmitted in separate data frames.

For example, the precision time protocol is used for generating the timestamp and synchronizing clock generators 106, 107, 108, 109, 110. Proceeding from corresponding trigger signals of clock generators 106, 107, 108, 109, 110, 111, timestamps are generated according to a synchronization standard, for example, IEEE802.1AS, IEEE 802.1ASbt, or IEEE1588. The timestamps are exchanged between the particular transmitting and receiving devices with the aid of these protocols, for example.

Figure 2:
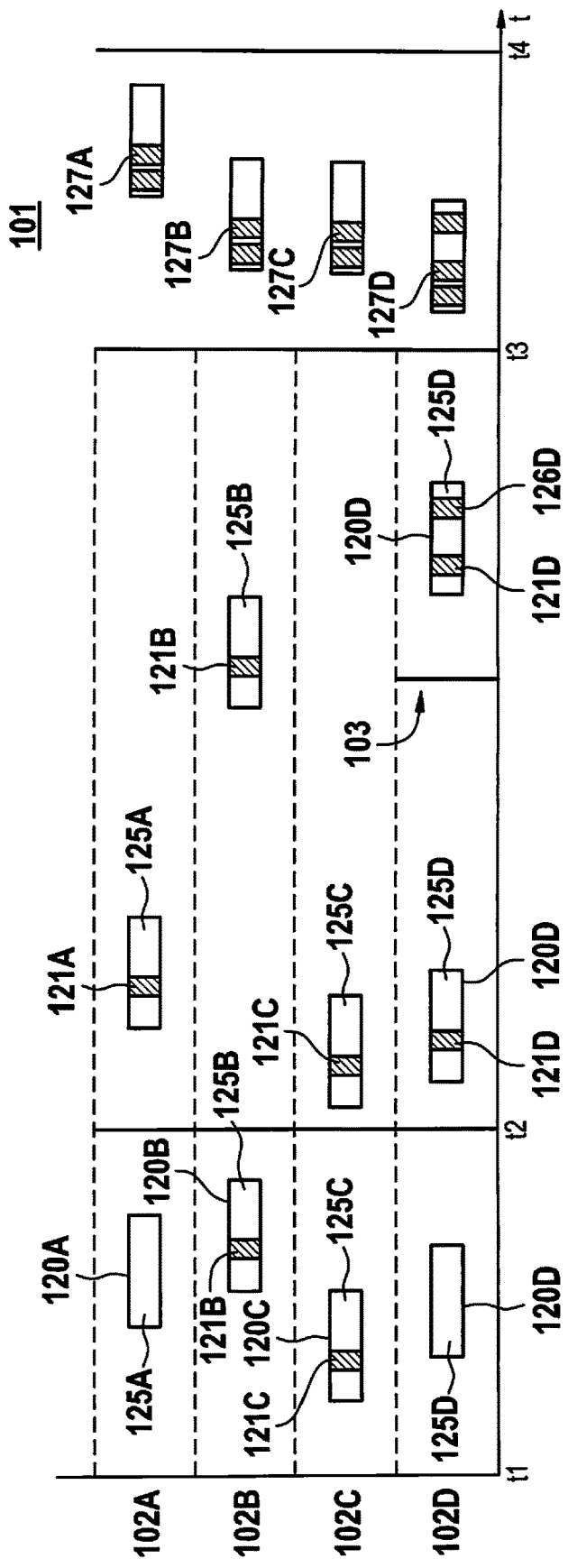
FIG. 2 schematically shows a signal flow of data packets.

FIG. 2 schematically shows a part of a signal flow of data packets.

As shown in FIG. 2, data packets 120A, 120B, 120C, 120D are generated in sensors 102A, 102B, 102C, 102D between a first point in time t1 and a second point in time t2. The generation of the data packets may take place at different points in time within a time interval between first point in time t1 and second point in time t2. It may be provided that a timestamp 121B, 121C is already generated at the point in time of the generation of the data packets. In this case, a data frame including both timestamp 121B, 121C and useful data 125B, 125C may be generated for joint transmission. Alternatively, useful data 125B, 125D may be provided with timestamp 121A, 121D only at the point in time of transmission. In each case, timestamp 121A, 121B, 121C, 121D characterizes a transmission time of particular data packet 120A, 120B, 120C, 120D.

Data frames shown in FIG. 2 include both a data packet including the timestamp and a data packet including the useful data in a shared data frame. Alternatively thereto, the timestamp may be transmitted together with an identification of the associated useful data packet in a separate data frame. The transmission of the data frame takes place in the example at different points in time which are after second point in time t2. Alternatively to a common second point in time t2 and a common first point in time t1, different first points in time t1 and/or different second points in time t2 may also be provided for one or multiple sensors 102A, 102B, 102C, 102D.

The transmission of a data frame or data packet 120D takes place in the example via switch 103. Switch 103 generates, upon receipt of data frame or data packet 120D, in particular at first interface 117, preferably with the aid of a cycle of the clock generator 108, a further timestamp 126D, which is added to data packet 120D in the example. Switch 103 relays data packet 120D thus generated, in particular via a second interface 118. Alternatively, the timestamp may be transmitted together with an item of identification which identifies data packet 120D in a separate data frame.

Data frames or data packets 120A, 120B, 120C, 120D are received by receiver 116 of control unit 101 between a third point in time t3 and a fourth point in time t4. It is provided that a third timestamp 127A, 127B, 127C, 127D is generated upon receipt. In the example, it is added to data frame or data packet 120A, 120B, 120C, 120D. Alternatively, it may be provided that timestamp 127A, 127B, 127C, 127D is stored in control unit 101, associated with particular data frame or data packet 120A, 120B, 120C, 120D or particular useful data 125A, 125B, 125C, 125D.

In addition, it may be provided that data frame or data packet 120A, 120B, 120C, 120D is analyzed and timestamp(s) 121A, 121B, 121C, 121D, 126D contained therein is/are recorded and stored, associated with mentioned data frames or data packets 120A, 120B, 120C, 120D or particular useful data 125A, 125B, 125C, 125D.

In more complex networks, multiple switches or control units may be connected to one another in series. In this case, multiple timestamps may be used by multiple control units or switches, which relay the particular data packet. In the case in which the timestamps are transmitted in separate messages, receiver 116 or control unit 101 is designed to store the particular timestamp associated with the particular data packets or useful data. For this purpose, the identification of the useful data or the particular data packet is used, for example.

In addition, packets may be assembled before the transmission and disassembled after the transmission.

In addition, the particular timestamp may be classified depending on the device which has generated the timestamp. For example, it is provided that timestamps which were generated by a sensor and further additionally introduced timestamps, which were generated by a switch, for example, are differentiated. For this purpose, the timestamps may include, for example, a unique identification of the device class or the device itself.

Figure 3:
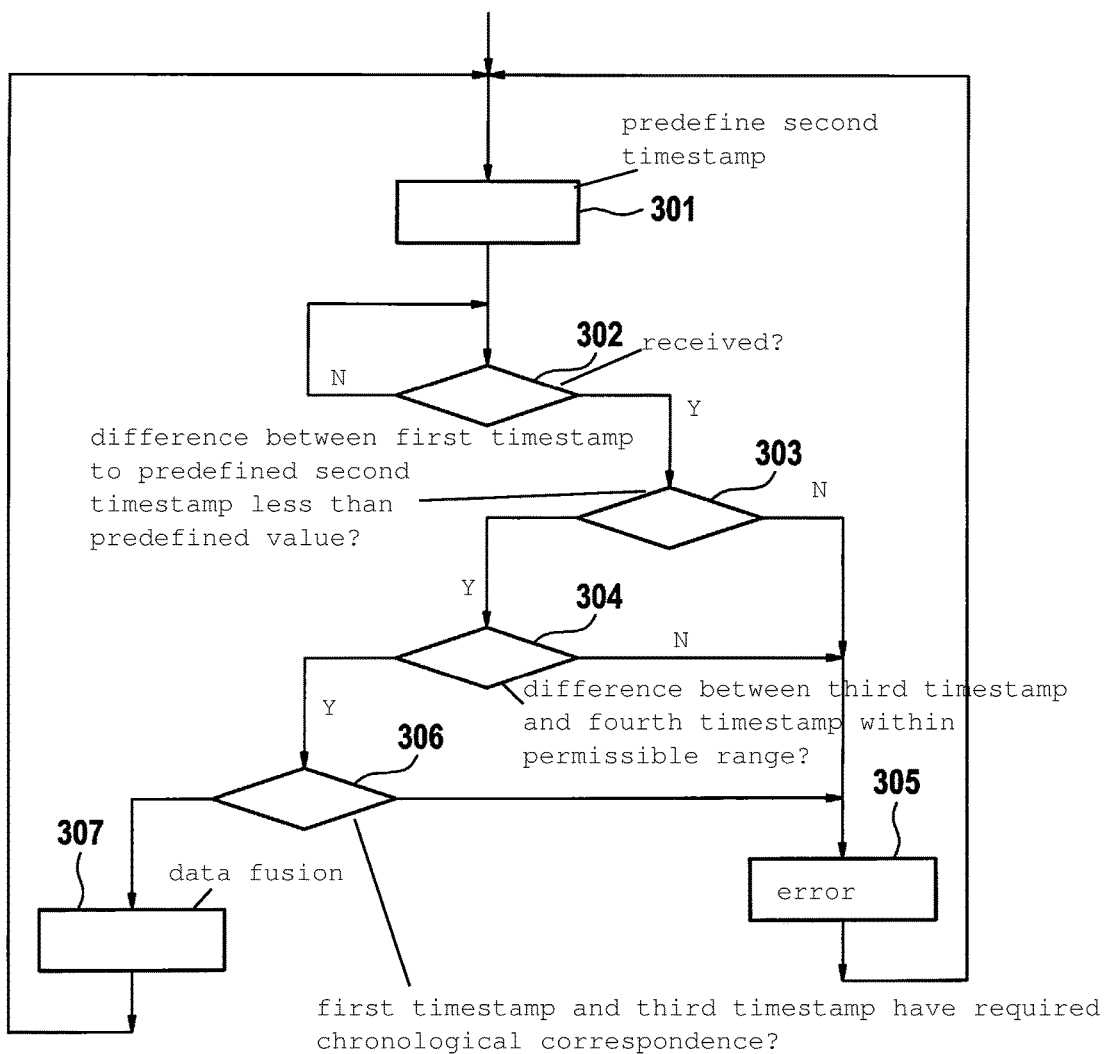
FIG. 3 schematically shows a flow chart.

A method for validating timestamps will be explained hereafter on the basis of the flow chart in FIG. 3.

In the example, different sensor data, for example, radar, LIDAR, or camera signals for a sensor fusion unit, which is provided in control unit 101, are transmitted as useful data. In this case, it is to be ensured in particular that the useful data which are used for the data fusion will also match with one another chronologically. The object of the fusion unit, which is provided as an application in control unit 101, for example, is to fuse the data of the sensors and to take into consideration the chronological relationship of the different useful data supplied by the sensors in relation to one another. It is problematic that, for example, due to different paths in the vehicle electrical system, different processing times of the switches or the sensors themselves, or as a result of the load on the data bus used for the transmission, the useful data of different sensors no longer arrive at predictable times at control unit 101 for the data fusion. A sensor fusion unit thus receives the associated data of individual sensors for the fusion at different times. In particular if Ethernet is used on the data bus, such differences occur, since Ethernet does not have deterministic behavior with respect to the transmission of data packets or data frames.

The method begins, for example, upon receiving useful data in a data frame or data packet, in particular in an Ethernet data frame.

The method will be described on the basis of the example of first useful data of a first sensor 102A and second useful data of a second sensor 102D. The example is also applicable to other useful data.

In the example, a data frame is received which contains a first data packet 125A, including the first useful data, and a second data packet 121A, including a first timestamp. The first timestamp characterizes a first transmission point in time of first data packet 125A. Alternatively, the first timestamp may also characterize the point in time of the generation of first useful data 125A. First data packet 120A and second data packet 121A may also be received in separate data frames. In each case, the particular timestamp may be associated with the particular useful data or data packets, for example, via a unique identification associated with the useful data or the data packets and the particular timestamps.

After the start, a step 301 is carried out.

In step 301, a second timestamp is predefined. The second timestamp characterizes, in the example, a first reception point in time of first data packet 120A from first sensor 102A. In the example, the first reception point in time characterizes the point in time of the reception at control unit 101. For example, for this purpose, upon receipt of first data packet 120A, or the first data frame, depending on the cycle of clock generator 111, a hardware stamp is generated at receiver 116 of control unit 101 and predefined as the second timestamp.

Subsequently, a step 302 is carried out.

In step 302, it is checked whether a third data packet 120D, including second useful data 125D, and a fourth data packet 121D, including a third timestamp, which characterizes a second transmission point in time of third data packet 120D or a creation point in time of second useful data 125D, was received. Step 302 is optional and is omitted, for example, if the corresponding data packets have already been received.

In step 302, a fourth timestamp is additionally predefined. The fourth timestamp characterizes, in the example, a second reception point in time of third data packet 120D, which was transmitted by second sensor 102D. In the example, the second reception point in time characterizes the point in time of the reception at control unit 101. For example, for this purpose, upon receipt of third data packet 120D, or the data frame, depending on the cycle of clock generator 111, a hardware stamp is generated at receiver 116 of control unit 101 and predefined as the fourth timestamp.

When third data packet 120D and fourth data packet 121D have been received, a step 303 is carried out. If optional step 302 is not carried out, step 303 is carried out after step 301.

If no third and no fourth data packet have been received in optional step 302, it may be provided that optional step 302 is repeated until reception of a third and a fourth data packet. In this case, the method may be ended with an error message if no third data packet or no fourth data packet is received for a predefined time. In addition, instead of waiting for the reception of a third or fourth data packet, an already received third and/or fourth data packet from a buffer memory may be used.

In step 303, the first timestamp is compared to the predefined second timestamp. In the example, this means that the first reception point in time of first data packet 120A is compared to the first transmission point in time of first data packet 120A or the point in time of the generation of first useful data 125A. If the difference between the two timestamps is less than a predefined value, a step 304 is carried out. Otherwise, a step 305 is carried out.

In step 303 it is checked for this purpose, for example, whether the first timestamp was generated earlier than the second timestamp. If the first timestamp was generated before the second timestamp, this indicates that the particular useful data were generated in the sensor and/or transmitted by the sensor before the reception point in time thereof at control unit 101.

The difference between the two timestamps or the predefined value is measured or determined, for example, in the system design of the vehicle electrical system, depending on the position of the sensor in relation to the control unit or the interposed switches and the data buses used. The predefined value is stored in control unit 101, for example.

For example, the predefined value is measured and stored during the end-of-line programming or during the first start of control unit 101.

Accordingly, a further comparison to a maximum value may be carried out, to check whether the difference between the timestamps exceeds the maximum value. The maximum value is, as already described for the predefined value, measured or determined during the system design or ascertained during the end-of-line programming or the first start of control unit 101 and stored in control unit 101.

The predefined value is, for example, in the range from 0-100 ms, preferably 5-100 ms, 0-10 ms, or is 0.

The maximum value is, for example, in the range from 1-100 ms, preferably 5-100 ms, 2-10 ms, or is 100 ms.

If the difference between the timestamps is outside the permissible range in this case, step 305 is carried out, otherwise, step 304 is carried out.

In step 305, the difference between the timestamps is outside the permissible range. For example, the difference between the timestamps is less than the predefined value, for example, <0, and indicates that one of the timestamps could be intentionally falsified, could be invalid, since synchronization is still not provided, or could be faulty due to bit errors, for example.

The difference may also be greater than the maximum value, for example, greater than 10 ms, 100 ms, or 5 ms. This means that the sensor data are possibly already too old to be able to be used for the data fusion.

In any case, a corresponding error may be stored in control unit 101 and/or the associated useful data may be discarded. After step 305, step 301 is carried out.

In addition, the method may be ended in step 305 if the deviation of the timestamps is greater than a further threshold value or if deviations of the timestamps occur too frequently.

In step 304, the third timestamp is compared to the fourth timestamp. This takes place in the example as described in step 303 for the first timestamp and the second timestamp. For this purpose, a predefined value or a maximum value, which is stored in particular in control unit 101, is also used. These may be the same values, or may be determined as different values as described in step 303.

If the difference between the third timestamp and the fourth timestamp is less than the predefined value, or the difference between the timestamps is within the permissible range, a step 306 is carried out. Otherwise, step 305 is carried out.

In step 306, the first timestamp, as the first validated timestamp, is compared to the third timestamp, as the second validated timestamp.

It is established by the comparison of the first timestamp, which characterizes the first transmission point in time of first data packet 120A, which includes first useful data 125A, to the third timestamp, which characterizes a second transmission point in time of third data packet 120D, which includes the second useful data 125D, whether the useful data to be used for the data fusion have the required chronological correspondence.

For example, a threshold value for the difference between the timestamps is predefined for this purpose. The threshold value is, for example, a time value in the range of milliseconds, for example, 100 ms, 5 ms, or 1 ms. For example, the threshold value is stored in control unit 101 and read out of the memory in step 306.

For example, the required chronological correspondence of the useful data exists if the validated timestamps thereof correspond or the absolute value of the difference of the points in time indicated in the timestamps is less than the threshold value.

If the required chronological correspondence exists, a step 307 is carried out. Otherwise, step 305 is carried out.

In step 307, first useful data 125A and second useful data 125D are used for the data fusion.

This means that at least the useful data are used as a function of the result of the comparison of the validated timestamps. It may thus be established more reliably, for example, on the basis of the reception points in time of the particular useful data, whether the useful data are already too old for use in the data fusion.

After step 307, step 301 is carried out.

A timestamp indicates points in time, for example, in the format hour, minute, millisecond, microsecond.

If multiple timestamps, for example, of a switch and a sensor, are associated with the same useful data, the additionally received timestamps may also be used in the particular comparison, classified according to the device which has generated them. The particular timestamps may thus be compared on the same level, i.e., the timestamps in each case of adjacent transmitting or receiving devices separately from the timestamps of devices connected via multiple further switches or control units. An incorrect response of the recognition of excessively large or excessively small time differences may thus be avoided.

If multiple timestamps are associated with specific useful data, a faulty timestamp, which characterizes a transmission point in time, thus recognized may additionally be replaced by a correct timestamp which characterizes the reception point in time of the particular useful data. Therefore, original timestamps of sensors may be corrected on the reception side. In this case, the robustness of the data fusion may be ensured, even if, for example, faulty timestamps are transmitted by the sensors due to bit errors, for example.

As described, sensors 102A, 102B, 102C, 102D, in addition to the transmission of the data packets having the useful data, are designed to transmit the data packets which characterize the transmission point in time of the useful data.

It is particularly advantageous to transmit a first data packet including first useful data of an application, a second data packet including an identification of the first data packet and a first timestamp, which characterizes a first transmission point in time of the first data packet, and to generate an interrupt for the transmission of the first data packet in the application. This means that the first timestamp characterizes a point in time immediately before the first transmission point in time of the first data packet.

A delay of the transmission time of the sensor message is thus advantageously recognizable. In addition, it is thus possible to determine how long the sensor data have stayed in the transmitter before they were transmitted. An additional time accuracy is thus also provided to the sensor messages. Unpunctual timestamps or useful data may therefore be recognized and discarded. Isolated errors in the time synchronization therefore no longer endanger the overall communication. The system may operate in a fail-operational way with regard to the sensor data integrity.

In addition, it is possible to calculate original sensor data origin points in time with the aid of the knowledge about the validity of the timestamp. For this purpose, the reception points in time may be counted back in control unit 101 by way of knowledge about the latency in the network to transmission times or times of the generation of the useful data. For example, a validated timestamp is generated in that an unpunctual timestamp, which indicates a transmission point in time or a point in time of the generation of the useful data, is generated by subtraction of the known latency time from the timestamp which indicates the reception point in time at control unit 101.

It is advantageously provided that the application identifies important, i.e., critical messages and triggers an interrupt for these messages, by which a timestamp is immediately transmitted before the transmission of the message.

Critical messages are recognized, for example, on the basis of the protocol type. Critical messages are, for example, messages which are transmitted using the UDP protocol or one of protocols 1722 or 1733. In contrast, for example, data which are transmitted with the aid of the TCP protocol are noncritical. In general, for example, all data are noncritical, which are transmitted using protocols which provide the renewed request for the dropped packets in the event of transmission errors. Data packets which transmit data of real time critical applications are recognized, for example, as critical messages.

The check as to whether a critical message is provided is carried out, for example, by classification of messages as critical or noncritical in a database or table. This may be carried out on the application level or in the transceiver.

For this purpose, sensors 102A, 102B, 102C, 102D are designed, for example, to store the database for classification in a nonvolatile memory or the table in a hardware module.

It is also provided, for example, that the application for generating the interrupt as a function of the classification is stored in a nonvolatile memory. During operation of particular sensor 102A, 102B, 102C, 102D, the carrying out of the application, the classification, and the generation of the interrupt for transmission of the timestamp are provided before the transmission of the useful data.

The recognition of the critical messages or the classification may advantageously differentiate between various types of critical messages. Accordingly, various actions may therefore be triggered for the transmission of the timestamps or an influence of transmission parameters, for example, the number of the timestamps or the frequency of the transmission.

In the second data packet, for example, the identification of the first data packet is transmitted together with a timestamp.

An association of the time synchronization message with the useful data recorded by the sensor is thus produced. The second data packet may also be transmitted in the same data frame with the first data packet.

Figure 4:
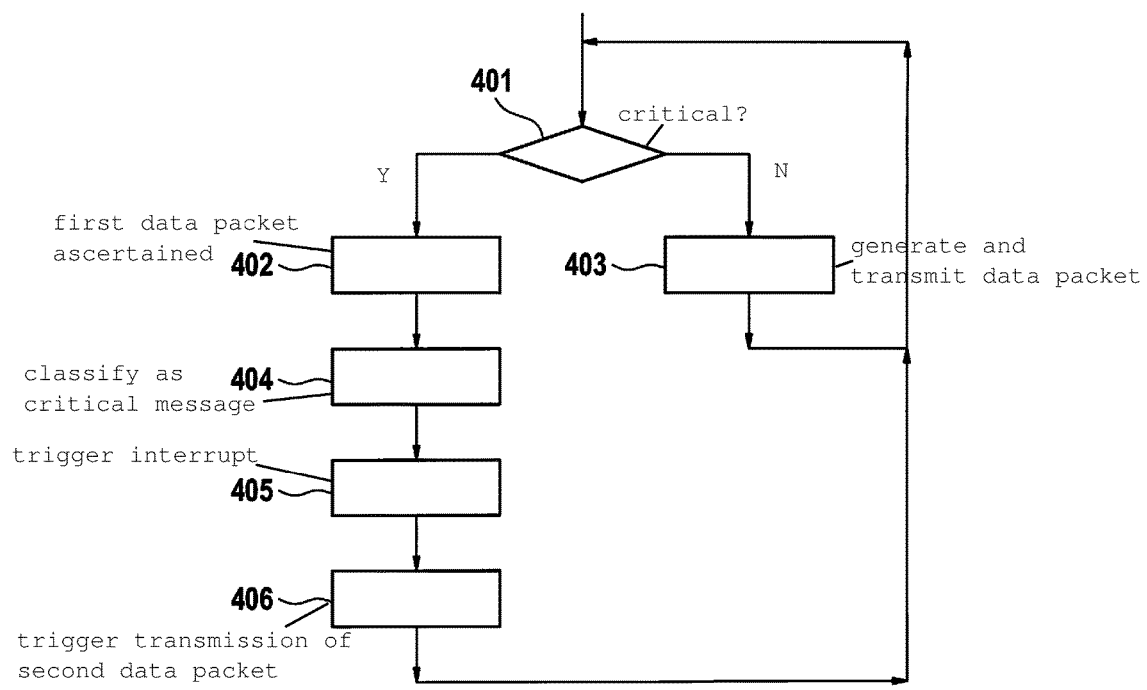
FIG. 4 schematically shows a flow chart.

A method for transmitting the first and second data packets is described hereafter on the basis of the flow chart in FIG. 4.

The method begins, for example, when an application provides useful data in a message for transmission via a communication transceiver.

In a step 401, it is checked after the start whether the useful data are to be transmitted in a critical message. For this purpose, for example, it is checked in the database or table whether the message provided by the application provides one of the protocol types defined as critical for the transmission. If a critical message is provided, a step 402 is carried out. Otherwise, a step 403 is carried out.

In step 403, a noncritical data packet is ready for transmission. The first data packet is accordingly generated and transmitted according to the noncritical protocol provided for its transmission, for example, TCP. Step 401 is then repeated for the next first data packet to be transmitted.

In step 402, the first data packet is ascertained. In addition, an identification of the first data packet may be generated. Subsequently, a step 404 is carried out.

In step 404, the critical message is further classified. For example, the first data packet is classified on the basis of the importance of the protocol type used for its transmission. For this purpose, for example, in addition to the protocol type used for the transmission of critical messages, parameters associated with this protocol type are stored in the database. These are read out from the database in step 404, to determine a parameter set as a function of the protocol type. For example, for a first protocol type, a synchronization is provided by the transmission of timestamp before and after the first data packet. For example, for a second protocol type, a synchronization is only provided by the transmission of a timestamp before the transmission of the first data packet.

The parameter is stored, for example, in the nonvolatile memory of particular sensor 102A, 102B, 102C, 102D and may be found therein via the identification of the first data packet.

Subsequently, a step 405 is carried out.

In step 405, the interrupt is triggered for the transmission of the second data packet before the transmission of the first data packet. Upon receipt of the interrupt, a timestamp is generated, for example, a hardware timestamp of a communication transceiver, for example, an Ethernet transceiver.

Subsequently, a step 406 is carried out.

In step 406, the parameters which are associated with the first data packet are read from the nonvolatile memory and analyzed. For example, it is established that the synchronization is to take place before the transmission of the first data packet including useful data and after the transmission of the first data packet. In this case, the transmission of the second data packet including the identification of the first data packet and the first timestamp is triggered. In addition, after the transmission of the second data packet, the transmission of the first data packet is triggered.

In addition, a further timestamp is generated upon the transmission of the first data packet, for example, a further hardware timestamp, as a function of the parameters. It is transmitted in a further data packet including the further timestamp, after the first data packet has been transmitted.

If the parameter set only establishes the transmission of the second data packet before the transmission of the first data packet, for example, the generation of the further timestamp and the transmission thereof are omitted.

Subsequently, step 401 is repeated for a further first data packet.

Figure 5:
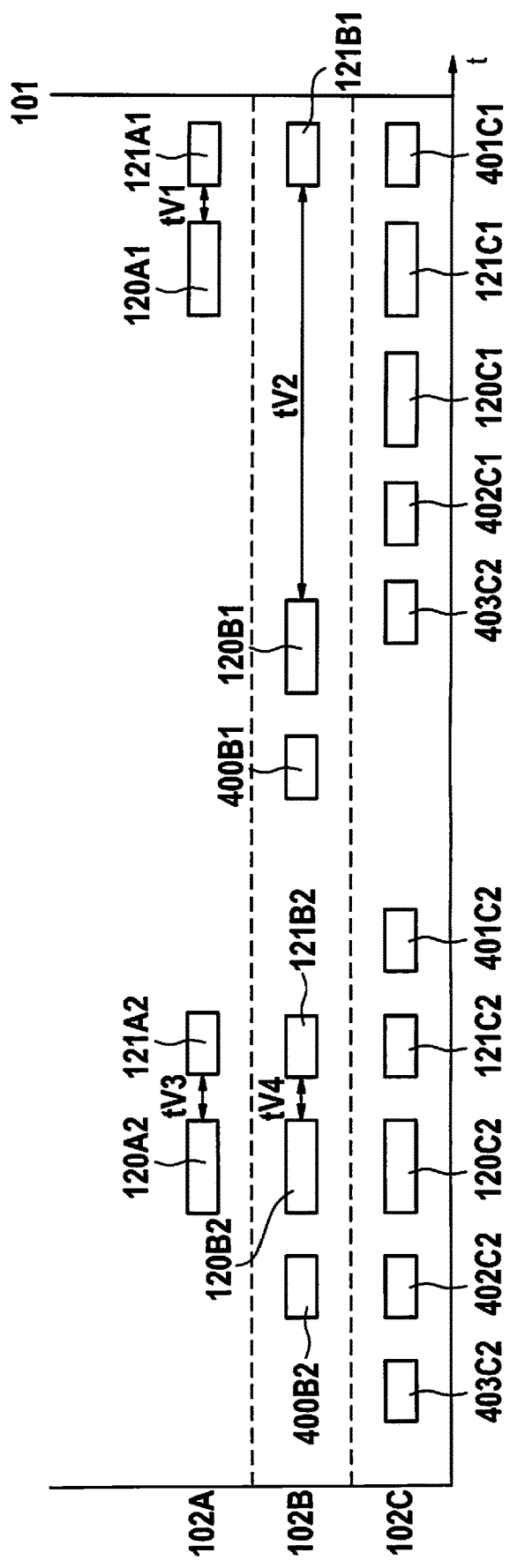
FIG. 5 schematically shows a signal flow of data packets.

FIG. 5 schematically shows the messages transmitted by the described method. A concept for securing sensor data for a first sensor 102A, a second sensor 102B, and a third sensor 102C on the particular transmission path thereof to control unit 101 is schematically shown.

First data packet 120A1 of first sensor 102A reaches control unit 101 having a time delay tV1 at first timestamp 121A1, which was transmitted in second data packet 121A1. The useful data in first data packet 120A1 are, for example, sensor data which are periodically recorded and transmitted by first sensor 102A. Accordingly, a further first data packet 120A2 includes useful data from the next periodic cycle of the sensor data recording. These data are transmitted, as shown in FIG. 5, in further first data packet 120A2. Further second data packet 121A2, including further first timestamp 121A2, is transmitted before further first data packet 120A2. The time interval between the transmission of further first data packet 120A2 and further second data packet 121A2 is time interval tV3. In the present case, time interval tV1 and time interval tV3 are a function of the dwell time of the particular data packets in transmitter 112. The time differences may also vary, for example, as a function of the load on data bus 104A or on the workload of transmitter 112. It may be ascertained on the basis of a comparison of the particular time differences to a predefined value of a time difference or on the basis of the comparison of the time differences to one another whether delays occurred, during the transmission of the first data packets having the useful data, in transmitter 112, on data bus 104A, or in receiver 116 of control unit 101.

Figure 6:
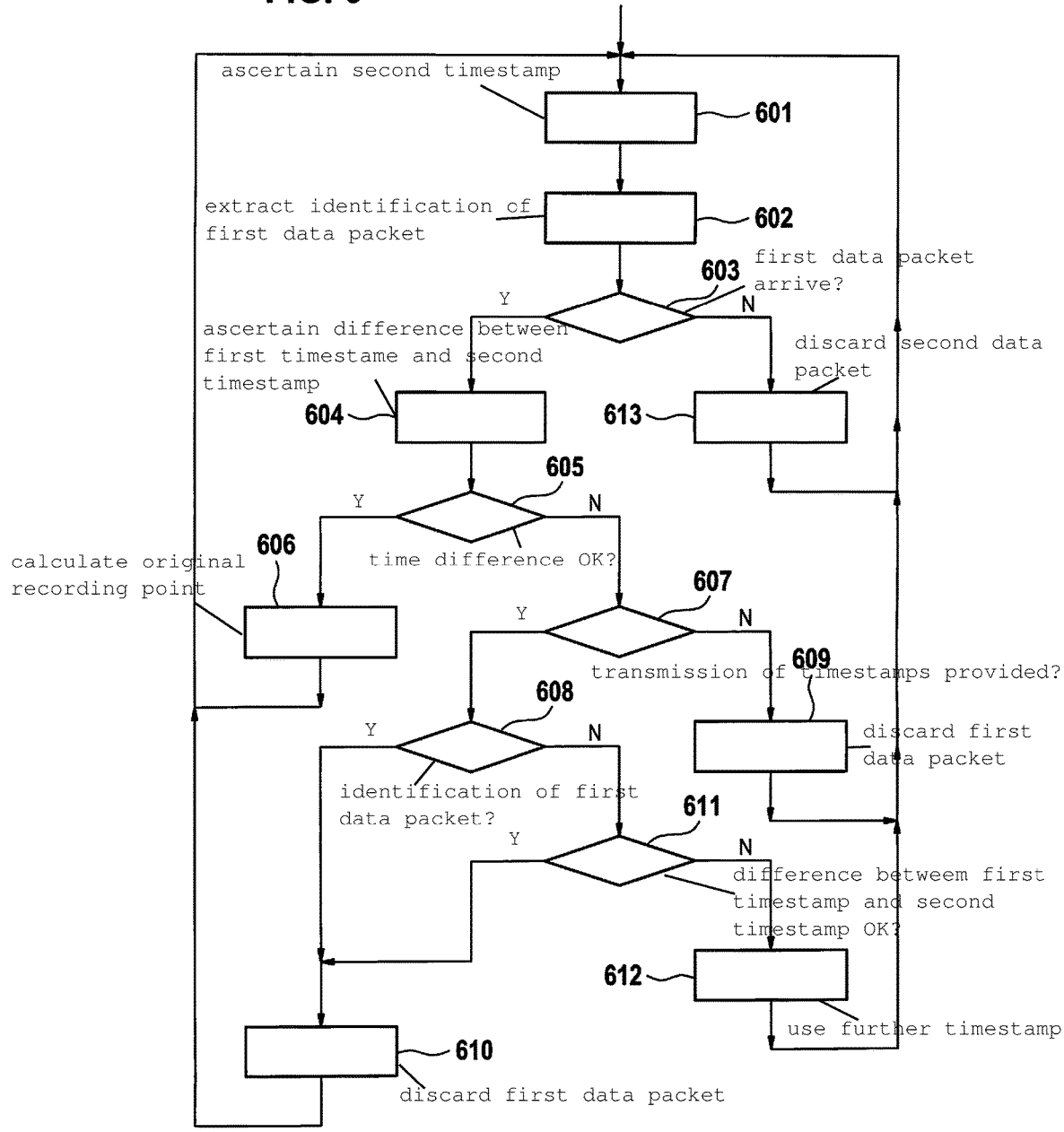
FIG. 6 schematically shows a flow chart.

A method for recognizing a delay of the sensor message is described hereafter on the basis of the flow chart shown in FIG. 6.

A first data packet 120A1 and a second data packet 121A1 are transmitted as shown in FIG. 5. Upon arrival of first data packet 120A1 at control unit 101, a first timestamp is generated, which indicates the reception point in time of first data packet 120A1. Second data packet 121A1 contains the identification of first data packet 120A1. Second data packet 121A1 contains a second timestamp, which indicates a point in time immediately before the transmission point in time of first data packet 120A1 at first sensor 102A or a generation point in time of the useful data transmitted in first data packet 120A1.

The method begins, for example, upon arrival of second data packet 121A1. For example, the method is used as part of step 305 of the method according to FIG. 3.

After the start, the second timestamp is ascertained in a step 601. In the example, the second timestamp is received in second data packet 121A1 and extracted therefrom. Subsequently, a step 602 is carried out.

In step 602, the identification of first data packet 120A1 is extracted from received second data packet 121A1. Subsequently, a step 603 is carried out.

In step 603, it is checked whether first data packet 120A1, i.e., the data packet having the identification of first data packet 120A1 has arrived. If this data packet has arrived, a step 604 is carried out.

If first data packet 120A1 does not arrive in a specifiable time interval, for example, 10 ms or 100 ms, or first data packet 120A1 arrives after this time interval, a step 613 is carried out.

In step 613, second data packet 121A1 and the associated timestamp are discarded. If a first data packet 120A1 has already arrived, it is also discarded. Subsequently, step 601 is carried out.

In step 604, the time difference between the first timestamp and the second is ascertained. In the example, a hardware timestamp is generated upon reception of first data packet 120A1 in the receiver. It is compared to the second timestamp to ascertain the time difference between the timestamps. For example, time difference tV1 between second data packet 121A1 and first data packet 120A1 is thus ascertained.

Subsequently, a step 605 is carried out.

In step 605, it checked whether the time difference, for example, time difference tV1, is in a predefinable range or is below a predefined threshold. For example, it is checked whether difference tV1<10 ms or tV1<100 ms. If the time difference is in the predefined range or below the predefined threshold, a step 608 is carried out. Otherwise, an optional step 607 is carried out. Instead of optional step 607, the received useful data may also be discarded and step 601 may be carried out.

In step 606, the first timestamp or second timestamp 121A1 is used to calculate the original recording point in time on the basis of second timestamp 121A1. In this case, second timestamp 121A1 characterizes the first transmission point in time of first data packet 120A1. As a function of knowledge about the latency of the data transmission or processing duration of the data in the sensor, the recording point in time may thus be calculated by subtraction of the latency and processing duration from the point in time indicated in second timestamp 121A1 or the first timestamp.

After this correction, the timestamps are validated. The timestamps thus validated may be processed in a process which runs in parallel in an application for the data fusion of the useful data as described above together with other validated timestamps, which were also successfully validated. If the method is carried out as part of step 305, the sequence branches to the comparison from steps 303, 304, or 306 using the corrected values, which previously led to the carrying out of step 305.

Subsequently, step 601 is repeated for further arriving data packets.

In step 607, a deviation of the time differences outside the predefined range exists. In this case, it is checked whether the transmission of timestamps after the transmission of the useful data is provided for the protocol type used. For this purpose, for example, the same database is used for the classification of the received messages which was described for the classification of the messages to be transmitted. If the transmission of timestamps is provided after the transmission of the useful data, a step 608 is carried out. Otherwise, a step 609 is carried out.

In step 609, first data packet 120B1 is discarded. Subsequently, step 601 is carried out for further data packets.

In step 608, it is checked whether a subsequently transmitted timestamp arrives with the identification of the first data packet.

For example, second sensor 102B is designed, as shown in FIG. 5, to transmit a further timestamp 400B1 after the transmission of first data packet 120B1. Further timestamp 400B1 contains, for example, a hardware timestamp generated during the transmission of first data packet 120B1 in second sensor 102B, which indicates the transmission point in time of second data packet 120B1. Second sensor 102B transmits the sensor data cyclically, for example. This is shown in FIG. 5 by a further first data packet 120B2 and a further first timestamp 121B2, which is transmitted in a further second packet 121B2, and represents a further subsequent timestamp 400B2. The interval between first data packet 120B1 and second data packet 121B2 is time difference tV2. As shown in FIG. 5, the corresponding interval between further first data packet 120B2 and further second data packet 121B2 is time difference tV4. In the example, this is shorter than time difference tV2. A deviation of time interval tV2 is thus established on the basis of the method in step 605, which is outside the predefined range or above the predefined threshold. Accordingly, it is established in this case in step 607 that the transmission of a subsequent data packet is provided for this protocol type. Subsequent timestamp 400B1 is thus received in step 608. If the reception of a subsequent timestamp does not take place within a further predefined time interval, a step 610 is carried out. Otherwise, a step 611 is carried out.

In step 610, first data packet 120B1 is discarded. Subsequently, step 601 is carried out for further received data packets.

In step 611, it is checked whether the difference between first timestamp 121B1 and second timestamp 400B1 exceeds a predefinable value. If the difference exceeds a predefinable threshold value, for example, 10 ms or 100 ms, step 610 is carried out. Otherwise, a step 612 is carried out.

In step 612, further timestamp 400B1, for example, a hardware timestamp, is used upon the transmission of first data packet 120B1 as the transmission point in time thereof or as the reception point in time of the useful data in first data packet 120B1. For this purpose, the point in time is stored together with the identification of the first data packet, for example, in the volatile memory to be relayed to the application for data fusion. Subsequently, step 601 is carried out for further data packets.

By way of this check of the sensor messages and the associated timestamp, individual time errors in the sensor message may be eliminated and a fail-safe operation may be implemented. This means that even if timestamp errors are present in the sensor message, this message may be verified using the subsequent messages. This means that in the event of a great time difference to the subsequent timestamps, a message is nonetheless valid, since one of the timestamps is incorrect.

It is therefore particularly advantageous, as shown on the example of third sensor 202C in FIG. 5, to provide further timestamps 401C1 and 401C2, which are transmitted before the transmission of first data packet 120C1 and 120C2, respectively. In the same way, it is particularly advantageous to provide multiple further timestamps 402C1, 403C2 and 402C2, 403C2, which are transmitted after the transmission of particular first data packet 120C1 and 120C2, respectively.

Due to the use of multiple of these upstream and downstream timestamps as described above for the upstream and downstream timestamps, the reliability of the method is increased further. Accordingly, the method described on the basis of FIG. 6 for checking the sensor data is modified in such a way that the particular timestamps are received and also used for the examination. For example, not only may an inconsistency therefore be established between the individual timestamps, but rather also whether the timestamp transmitted before first data packet 120C1 or after first data packet 120C1 is incorrect.

The particular methods are implemented, for example, as computer programs and stored on a computer-readable medium. The control units or sensors are devices which are designed to carry out the particular methods. In particular, the control unit and the sensors are designed to interpret and carry out the particular steps of the method or the machine-readable instructions of the computer program, to transmit and receive the timestamps and the useful data in the corresponding data packets and analyze them.

For this purpose, both control unit 101 and sensors 102A, 102B, 102C, 102D have, for example, microprocessors, which cooperate with clock generators 106, 107, 108, 109, 110, 111 and transmitters and receivers 112, 113, 114, 115, 116 to interpret and carry out the machine-readable instructions of the computer program and thus carry out the methods.

What is claimed is:

1. A method for validating a timestamp of a data transmission, comprising:
   receiving, by a receiver of a control unit, a first data packet, including first useful data, from a first transmitter;
   receiving, by the receiver, a second data packet, including a first timestamp associated with the first useful data;
   comparing, by the control unit, the first timestamp to a predefined second timestamp which is associated with the first useful data, to determine a first validated timestamp, which is associated with the first useful data;
   receiving, by the receiver, a third data packet, including second useful data, from a second transmitter, which is different from the first transmitter;
   receiving, by the receiver, a fourth data packet, including a third timestamp associated with the second useful data;
   comparing, by the control unit, the third timestamp to a predefined fourth timestamp which is associated with the second useful data, to determine a second validated timestamp, which is associated with the second useful data; and
   comparing, by the control unit, the first validated timestamp to the second validated timestamp; and
   discarding, by the control unit, at least one of the first useful data and the second useful data based on results of the comparing of the first validated timestamp to the second validated timestamp,
   wherein the predefined second timestamp characterizes a reception point in time of the first data packet and the first timestamp characterizes one of: i) a transmission point in time of the first data packet, ii) a point in time immediately before the transmission of the first data packet, or iii) a generation point in time of the first useful data contained in the first data packet.

2. The method as recited in claim 1, wherein the first, second, third and fourth data packets are transmitted with the aid of an Ethernet protocol.

3. The method as recited in claim 2, wherein the Ethernet protocol is one of Ethernet AVB, Ethernet TSN, 1000 Mbit/s Ethernet, 100 Mbit/s Ethernet, or 10 Mbit/s Ethernet.

4. The method as recited in claim 1, wherein the first, second, third and fourth data packets are transmitted via at least one twisted two-wire line made of copper.

5. The method as recited in claim 1, wherein the predefined fourth timestamp characterizes a reception point in time of the third data packet, and the third timestamp characterizes one of: i) a transmission point in time of the third data packet, ii) a point in time immediately before the transmission of the third data packet, or iii) a generation point in time of the second useful data in the third data packet and which is associated with the same data packet.

6. The method as recited in claim 1, wherein the first timestamp characterizes a point in time immediately before the transmission of the first data packet.

7. The method as recited in claim 1, wherein the first useful data and the second useful data are processed by data fusion as a function of the result of the comparison of the first validated timestamp and the second validated timestamp.

8. The method as recited in claim 1, wherein one of: i) the first data packet and the second data packet are received in a data frame which includes both the first and the second data packets, or ii) the third data packet and the fourth data packet are received in a data frame which includes both the third and the fourth data packets.

* * * * *